April 13, 1954  C. C. MITCHELL  2,675,284
CONSTRUCTION OF RIGID SLOTTED CYLINDERS
Filed Dec. 12, 1950
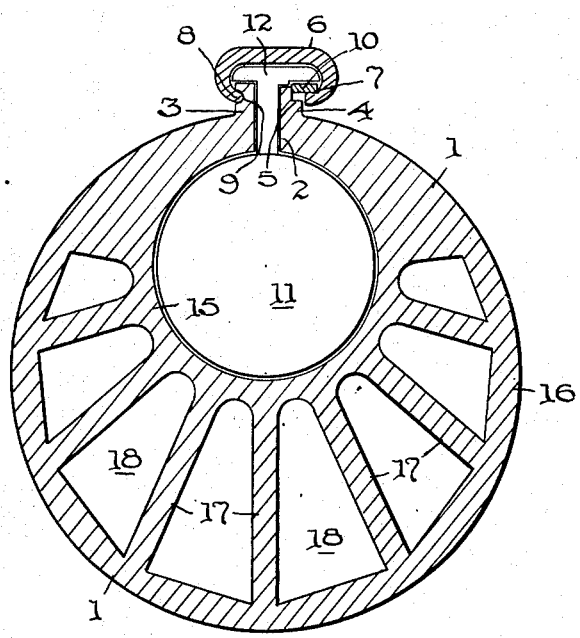
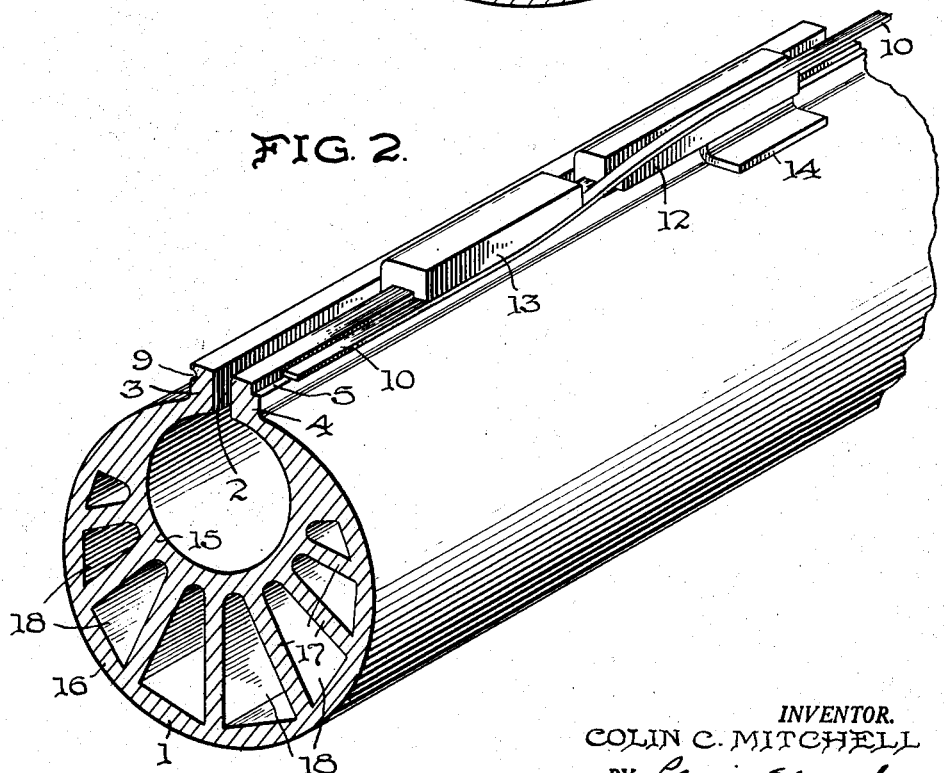
INVENTOR.
COLIN C. MITCHELL
ATTORNEYS Patented Apr. 13, 1954

2,675,284

UNITED STATES PATENT OFFICE 2,675,284

CONSTRUCTION OF RIGID SLOTTED CYLINDERS

Colin Campbell Mitchell, Edinburgh, Scotland, assignor to Brown Brothers & Co., Limited, Edinburgh, Scotland, a corporation of Great Britain and Northern Ireland Application December 12, 1950, Serial No. 200,331

Claims priority, application Great Britain July 10, 1950

2 Claims. (Cl. 309—2)

This invention relates to an improved construction of slotted cylinder of the type used in certain kinds of catapult launching devices, wherein the requisite section modulus to resist deformation by the internal pressure is derived from structural reinforcement of the cylinder whereby to compensate for the loss of strength caused by the presence of the slot.

The construction consists of an inner wall, a series of longitudinal ribs and an outer wall.

The cylinder may be cast, with or without a metallic liner, or it may be fabricated by welding, or it may be made by cutting slots in a cylindrical bar of a diameter equal to that of the outer wall and forming the outer wall by the insertion of plates between the edges of the ribs resulting from the cutting of the slots.

A long cylinder may be made up by joining together a series of short lengths with flanges, or by welding short lengths together.

The longitudinal chambers formed between the ribs may be used for controlling the temperature of the cylinder where the working fluid within the cylinder is at a high temperature.

With the described construction maximum ridigity is obtained with minimum weight. The thicknesses and diameters of the inner and the outer walls, and the thicknesses and number and disposition of the ribs may be chosen to suit the working conditions and pressures for which the cylinder is designed.

The slot may be on the upper side of the cylinder and merge into a recess to receive a sealing strip; the cylinder bore being eccentric to the ribbed structure.

There may operate in the slotted cylinder a piston to which is connected a part projecting through the slot as described in the specification of application No. 103,520, filed July 7, 1949, and now U. S. Patent No. 2,603,190, issued July 15, 1952.

The invention will be further described in connection with the accompanying drawing, in which:

Fig. 1 is a transverse sectional view of the cylinder of the invention with the associated sealing parts, and Fig. 2 is a perspective view of a portion of the cylinder with the clamp removed to show the shoes.

In the drawings 1 denotes the cylinder slotted longitudinally at 2. 3 and 4 denote upstanding flanges bounding the slot 2 which opens outwardly from the cylinder bore. One edge of the flange 4 is stepped at 5. 6 denotes a clamp member substantially of C-shape in cross section, the inner edge of one tip of the clamp member 6 being stepped at 7, and the other tip being rounded at 8 to engage a groove 9 of semi-circular cross section formed in the flange 3. 10 denotes a flexible bridging strip engageable with the steps 5 and 7. 11 denotes a main piston slidable in the cylinder 1; 12 denotes a shoe connected to the piston 11 and adapted to raise the adjacent portion of the strip 10 out of the steps 5 and 7, and 13 denotes a second shoe, connected to the piston 11 and adapted to press the strip 10 into the checks 5 and 7. 14 denotes an actuating bar fixed to the shoe 12, said bar being connectible to mechanism to be operated by movement of the piston 11.

The above structure and the method of operation are fully described in my aforesaid patent.

As more particularly shown in Fig. 1, the cylinder includes an inner wall 15 surrounding the bore of the cylinder and an outer wall 16 connected to the inner wall by spaced ribs 17 extending longitudinally of the cylinder. The walls 15 and 16 are eccentric to one another and merge at the side of the bore adjacent the slot 2, which is the side of least eccentricity. The ribs 17 are positioned at the side of the bore remote from the slot 2, that is, the side of greatest eccentricity. The ribs 17, together with the inner and outer walls 15 and 16 form chambers or spaces 18 for the circulation of a heat-exchanging medium. The ribs 17 also provide a structural reinforcement which prevents the edges of the slot 2 from spreading apart upon the building up of a substantial pressure in the bore of a cylinder, as during a launching operation.

What is claimed is:

1. A non-flexible cylinder construction comprising an inner wall defining a cylindrical bore, an outer wall eccentric with respect to the inner wall, spaced ribs connecting the inner and outer walls and with said walls forming passages for a heat-exchanging medium, the inner and the outer walls merging at the side of the bore of least eccentricity with respect to the bore, the merged portions of the walls having a slot extending substantially radially through them to the bore, and means for sealing said slot whereby a pressure may be built up in said bore, said spaced ribs being at the side of the bore remote from said slot.

2. A cylinder construction as defined in claim 1, in which the spaced ribs form a series of passages extending throughout at an angle of at least about 180 degrees.

References Cited in the file of this patent

UNITED STATES PATENTS

| Number | Name | Date |
|---|---|---|
| 784,636 | Smith | Mar. 14, 1905 |
| 795,667 | Wallace | July 25, 1905 |
| 1,484,240 | Still | Feb. 19, 1924 |
| 2,200,427 | Merz | May 14, 1940 |
| 2,274,519 | Barrett | Feb. 24, 1942 |

FOREIGN PATENTS

| Number | Country | Date |
|---|---|---|
| 471,055 | Great Britain | Aug. 27, 1937 |